United States Patent
Qian et al.

(10) Patent No.: US 6,678,437 B2
(45) Date of Patent: Jan. 13, 2004

(54) METHOD OF AND ARCHITECTURE FOR OPTICALLY SWITCHING LIGHT COMMUNICATION SIGNALS IN FIBER OPTIC NETWORKS AND THE LIKE

(75) Inventors: Dahong Qian, Westford, MA (US);
Marc Hertzberg, Sudbury, MA (US);
Da-Hai Ding, Lexington, MA (US);
Wayne Wong, Framingham, MA (US);
Amit Burstein, Tewksbury, MA (US)

(73) Assignee: Analog Devices, Inc., Wilmington, DE (US)

( * ) Notice: Subject to any disclaimer, the term of this patent is extended or adjusted under 35 U.S.C. 154(b) by 0 days.

(21) Appl. No.: 09/823,811

(22) Filed: Mar. 30, 2001

(65) Prior Publication Data

US 2002/0141689 A1 Oct. 3, 2002

(51) Int. Cl.[7] ................................. G02B 6/26
(52) U.S. Cl. ............................ 385/18; 385/17; 385/19
(58) Field of Search ............................ 385/16, 17, 18, 385/19, 12, 13; 359/245, 318, 290, 291, 292, 230

(56) References Cited

U.S. PATENT DOCUMENTS

| | | | | |
|---|---|---|---|---|
| 4,162,825 A | * | 7/1979 | Dowty | 126/601 |
| 4,664,487 A | * | 5/1987 | Tam | 359/874 |
| 5,808,780 A | * | 9/1998 | McDonald | 310/328 |
| 6,140,979 A | * | 10/2000 | Gerhard et al. | 345/7 |
| 6,245,590 B1 | * | 6/2001 | Wine et al. | 438/14 |
| 6,335,824 B1 | * | 1/2002 | Overbeck | 359/368 |
| 6,360,035 B1 | * | 3/2002 | Hurst et al. | 385/16 |
| 6,379,510 B1 | * | 4/2002 | Kane et al. | 204/192.27 |
| 2001/0036206 A1 | * | 11/2001 | Jerman et al. | |
| 2002/0006247 A1 | * | 1/2002 | Vaganov | |

FOREIGN PATENT DOCUMENTS

WO    WO 01/95009    * 12/2001

* cited by examiner

*Primary Examiner*—Frank G. Font
*Assistant Examiner*—Kevin C Kianni
(74) *Attorney, Agent, or Firm*—Rines and Rines

(57) ABSTRACT

A novel optical path switching system, architecture and technique wherein light beam data traffic is to be switched by MEMS mirrors between source and destination nodes, and test ports are used to set up optical paths even before the real data traffic is propagated, with a combination of an electrical mirror-sensing feedback loop for controlling coarse mirror positioning, and an optical path power-sensing feedback loop for controlling fine adjustments in the mirror position.

12 Claims, 9 Drawing Sheets

Test ports on port card used to setup and verify Working Switch path.

Test ports on port card used to setup and verify Working Switch path.

METHOD OF AND ARCHITECTURE FOR OPTICALLY SWITCHING LIGHT COMMUNICATION SIGNALS IN FIBER OPTIC NETWORKS AND THE LIKE

FIELD

The invention is concerned with the field of fiber optical communication architectures and network systems, and the problems of optically switching fiber-carried light signals between input and output fibers in high speed optical communication networks and the like, with more particular concern for optical cross-connect switching and control between fiber optical input and output (I/O) bundle arrays.

BACKGROUND

The switching of signal light beams between optical fiber bundles carrying data optical I/O cards in communication networks and systems is currently being addressed with the aid of optical microelectric-electromechanical devices (MEMS or MOEMS) carrying tiltable micro-mirrors orientable by electrical signal control to deflect incident light beams along desired paths—switching the output light from input fibers via reflection from the micro-mirrors to predetermined fibers in an output fiber bundle—the so-called optical cross-connect switching mentioned above.

Examples of such MEMS devices are disclosed, for example, in U.S. Pat. Nos. 6,052,498; 6,147,876; 6,150,724; and 6,151,173; and details of such optical switching systems are described, for example, in the following references:

[1] "Flexible, Modular, Contact Fiber Optic Switch", Slater, et al., Xros Patent Application, WO 00/20899. Apr. 13, 2000;

[2] "Sensing Configuration for Fiber Optic Switch Control System", Laor, et al., Astarte Fiber Networks, Inc., U.S. Pat. No. 6,097,858, Aug. 1, 2000;

[3] "Optical MEMS for Lightweight Networks", David Bishop, SC233, SPIE Photonics East, Nov. 8, 2000

In general, such free-space optical switches steer the input light from any one of input fibers to any one of the output fibers. The number of input fibers and output fibers can range from tens to thousands. The principal challenges to controlling the light are providing for:

quickly moving one or multiple light beams from one location to another without disturbing the existing connections;.

fine adjusting of the light beam so that the beam is precisely placed into the optimal coupling range of the output fiber, so that the optical signal loss due to the coupling can be reduced to minimal—this loss being the major contributor to the total insertion loss of the optical switch;

precisely maintaining the connections despite possible mechanical or thermal disturbances;

establishing multiple connections simultaneously as requested by higher level provisioning software and within certain prescribed ranges;

adapting to the switch device architecture, as by providing the micro-mirror array chips with on-chip actuation and sensing circuitry; and minimizing the space and computation power requirements for off-chip signal processing and control systems.

In the implementation of, for example, the optical switches of the above-cited Slater et al reference [1] and other similar prior art systems, electrical signal feedback circuits for establishing precise mirror position are widely used.

A piezoresistive sensing mechanism is generally provided on the torsional mirror support to measure position of the mirror. This sensing signal is fed to an error amplifier with a command input from digital signal processor a (DSP)-controlled digital analog controller (DAC). The error signal is fed through the analog controller to control the actuation or control voltage signal orienting the mirror. Problems and limitations with this electrical feedback approach, however, arise from the facts that the controller is implemented in analog components which are not flexible; the controller is not scalable because each mirror needs its control; and the DSP is also not scalable because it is tied to the controller all of the time.

Resort has therefore been taken, as described in the Bishop reference [3] above, to the use of external optical feedback without using such on-chip electrical feedback signals—i.e. using only port card optical power feedback. Since such involve a very slow loop, however, this poses extremely high requirements on MEMS design, in that the resonant frequency has to be much higher than the disturbance. The optical power feedback from the VO cards, furthermore, cannot give directional information. This thus requires extra time and computation power to adjust the mirror beam positions. While additional optical sensing schemes can be built into the optical box as in the Bishop proposal, this further increases the complexity of the optical box and adds more variables to control, i.e. the relative positions and alignment of the optical sensing elements in the optical box.

The present invention, on the other hand, through a novel use of intermediate node monitoring and with the use of test and real traffic data path switching, has admirably overcome the above-described and other limitations of such prior art techniques, as will later be more fully explained.

OBJECTS OF THE INVENTION

An object of the present invention, accordingly, is to provide a new and improved approach, method, architecture and system for optically switching light communication signals in fiber optic networks and the like that obviate the above and other prior art limitations and problems, and, indeed, provide for faster switching and optical path connections than have heretofore been available with optical cross-connect and other switching techniques.

A further object is to provide such improvement with novel working and test protection switching at intermediate nodes of the network that reduce overall connection setup time.

Other and further objects are stressed in the descriptions that follow and are more particularly pointed out in the appended claims.

SUMMARY

In summary, however, from one of its broader viewpoints, the invention embraces in an optical path switching system wherein light beam data traffic is to be switched by MEMS orientable mirrors between a source node and a destination node through intermediate nodes having ingress and egress ports that are to be connected to set up the desired optical path connection between the source and destination nodes and under the control of a protocol control plane, a method of reducing the overall switch connection setup time while guaranteeing the integrity of the connection before the actual propagating of the data traffic from the source, that comprises, transmitting a test light beam from the ingress port of each intermediate node to a test detector at its egress port upon the identifying from the control plane of the ingress and egress port numbers of the node, thereby to set up and verify the integrity of an optical path connection therebetween; thereupon terminating the test light beam transmission; and then awaiting the subsequent propagation of the data traffic from the source along the setup-connected optical path to the selected destination node.

Preferred and best mode designs and embodiments are hereinafter explained in detail.

DRAWINGS

The invention will now be described in connection with the accompanying drawings, FIG. 1 of which is a diagram representative of configurations of optical cross-connect upon the control systems of which the present invention significantly improves as earlier stated and as hereinafter more fully detailed;

FIG. 2 is a block and explanatory diagram of the connection setup network flow envisaged by the present invention, illustrating the relationships underlying the provisioning signaling flow in accordance with the techniques of the invention;

FIGS. 3A and B are more detailed block and circuit diagrams used at the nodes of FIG. 2 and illustrating the connection setup flow of the invention, involving real data traffic working and laser test protection switching intermediate nodes of the network;

FIG. 4 is a flow diagram of a preferred algorithmic software-implemented operation and control of the MEMS micro-mirror light beam switching of the system of FIG. 3;

FIG. 5 details preferred control loops for each MEMS micro-mirror light path of the optical switching system;

Figure 8A:
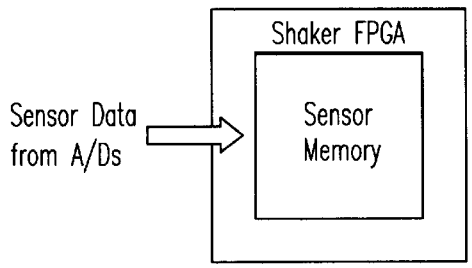
Figure 8B:
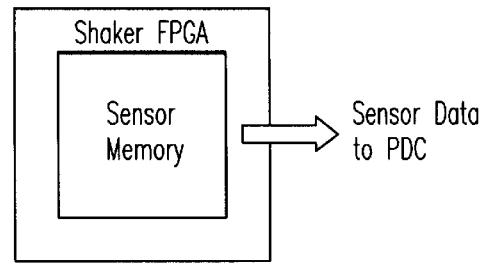
Figure 8C:
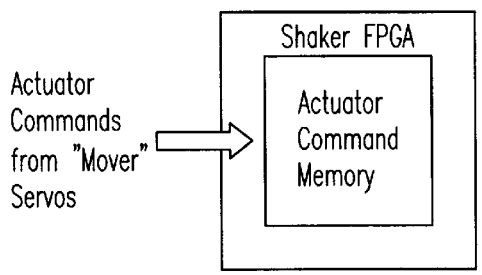
Figure 8D:
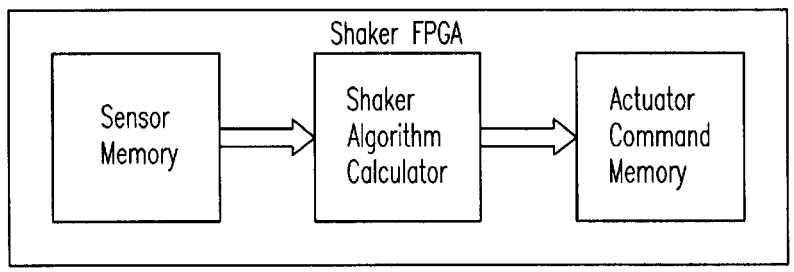
Figure 8E:
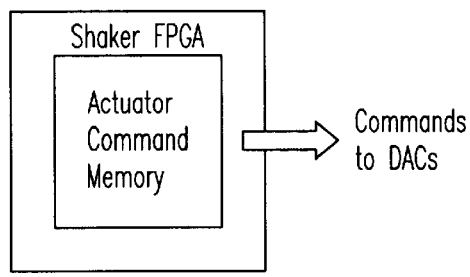
Figure 9:
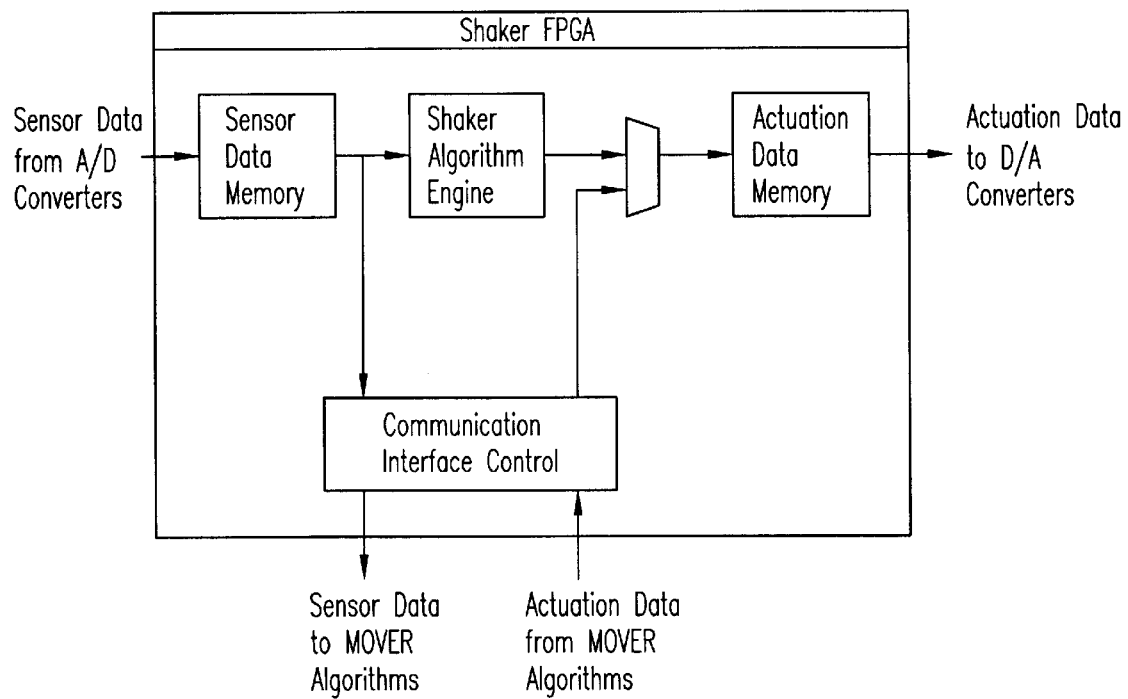
Figure 10:
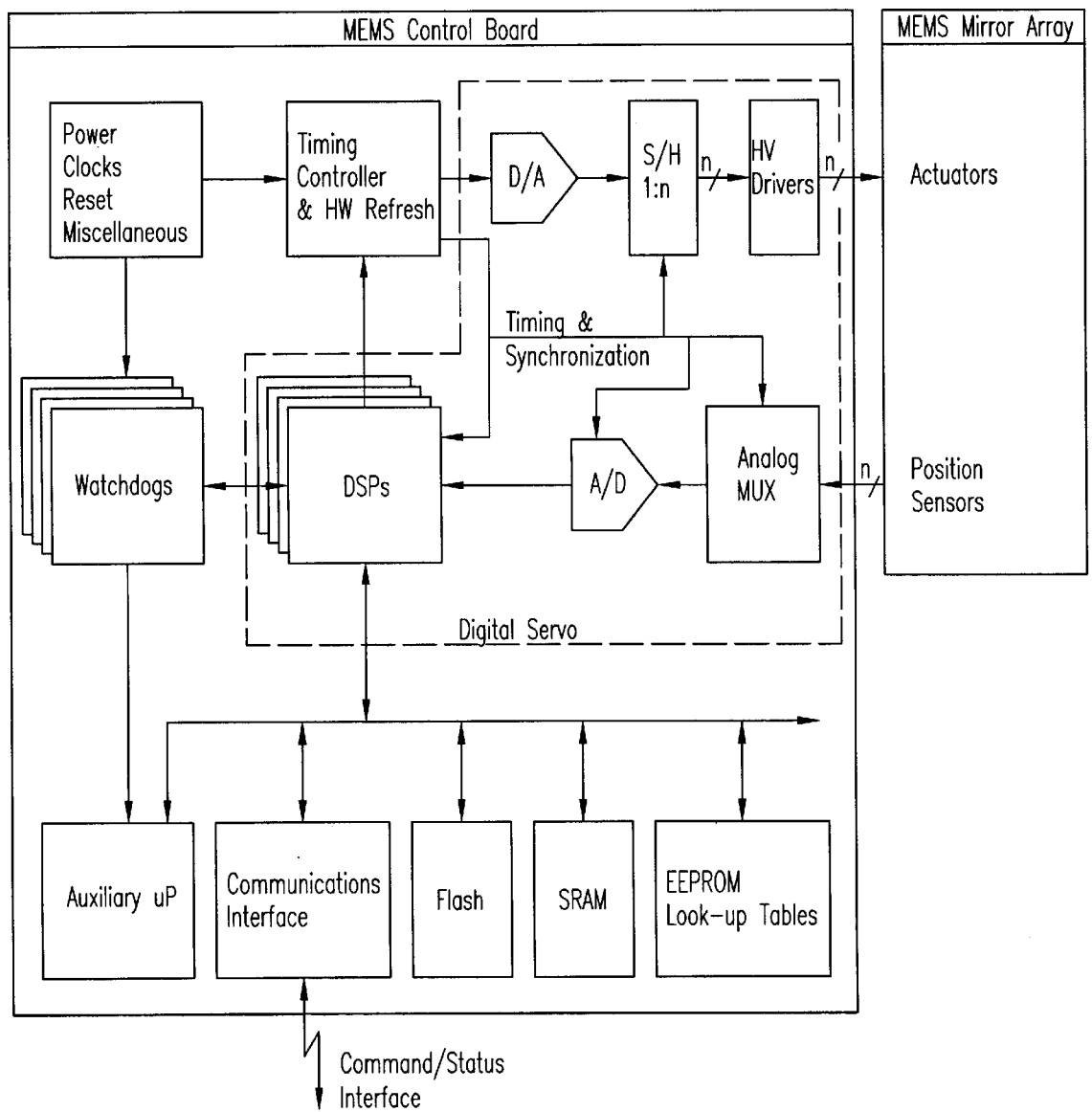
Figure 11:
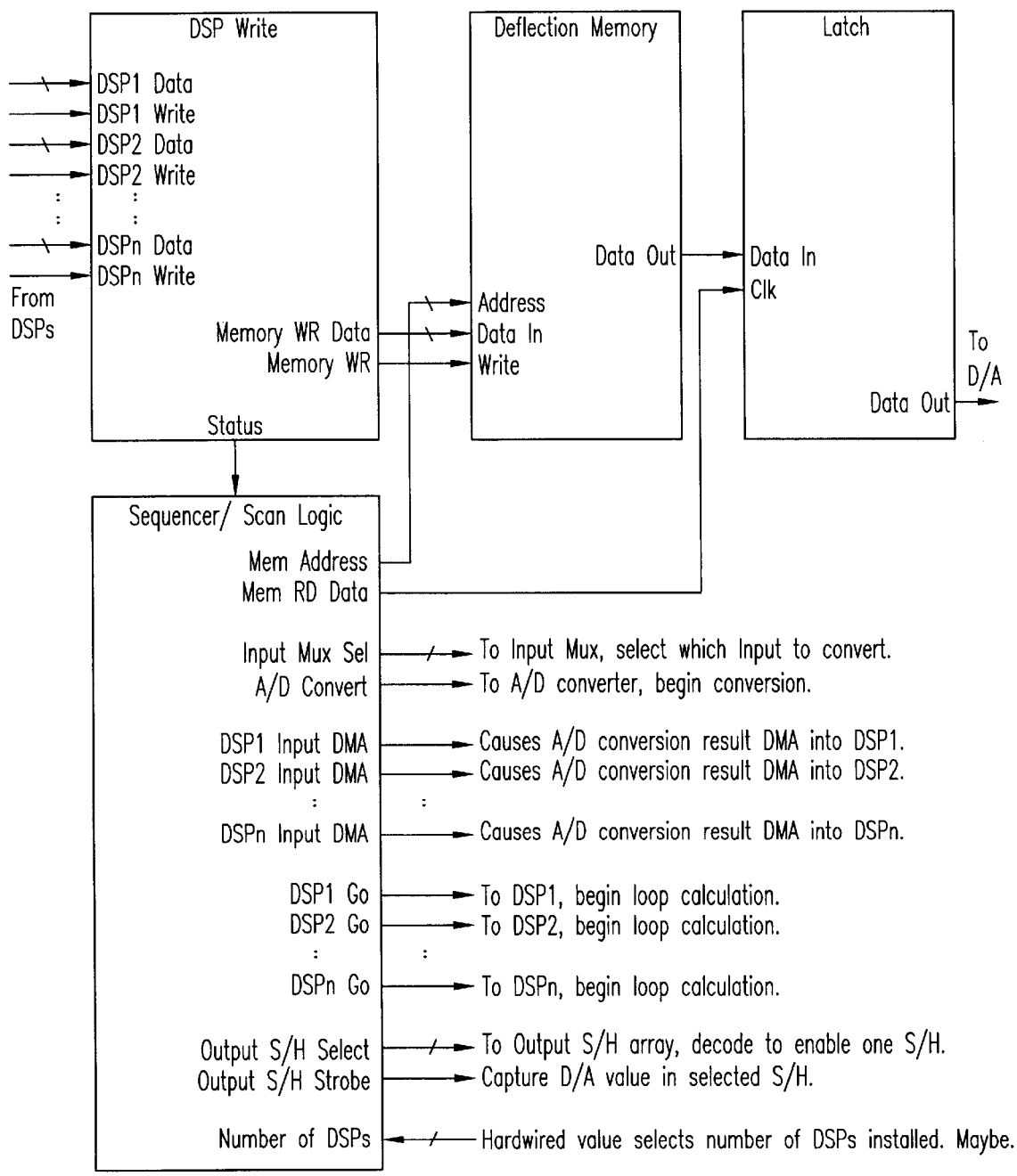

FIGS. 8(A)–(E) show successive operational steps in the micro-mirror "shaker" algorithmic flow;

FIG. 9 outlines the micro-mirror "shaker"/"mover" data flow with the operation of FIGS. 8(A)–(E);

FIG. 10 is a block and circuit diagram of an alternative digital control system for the MEMS micro-mirror arrays using a corresponding array of one or more DSPs for executing controller algorithms; and FIG. 11 presents the timing controls for the digital servos of FIG. 10, detailing the micro-mirror deflection memory implementation.

DESCRIPTION OF PREFERRED EMBODIMENTS OF THE INVENTION

Figure 1:
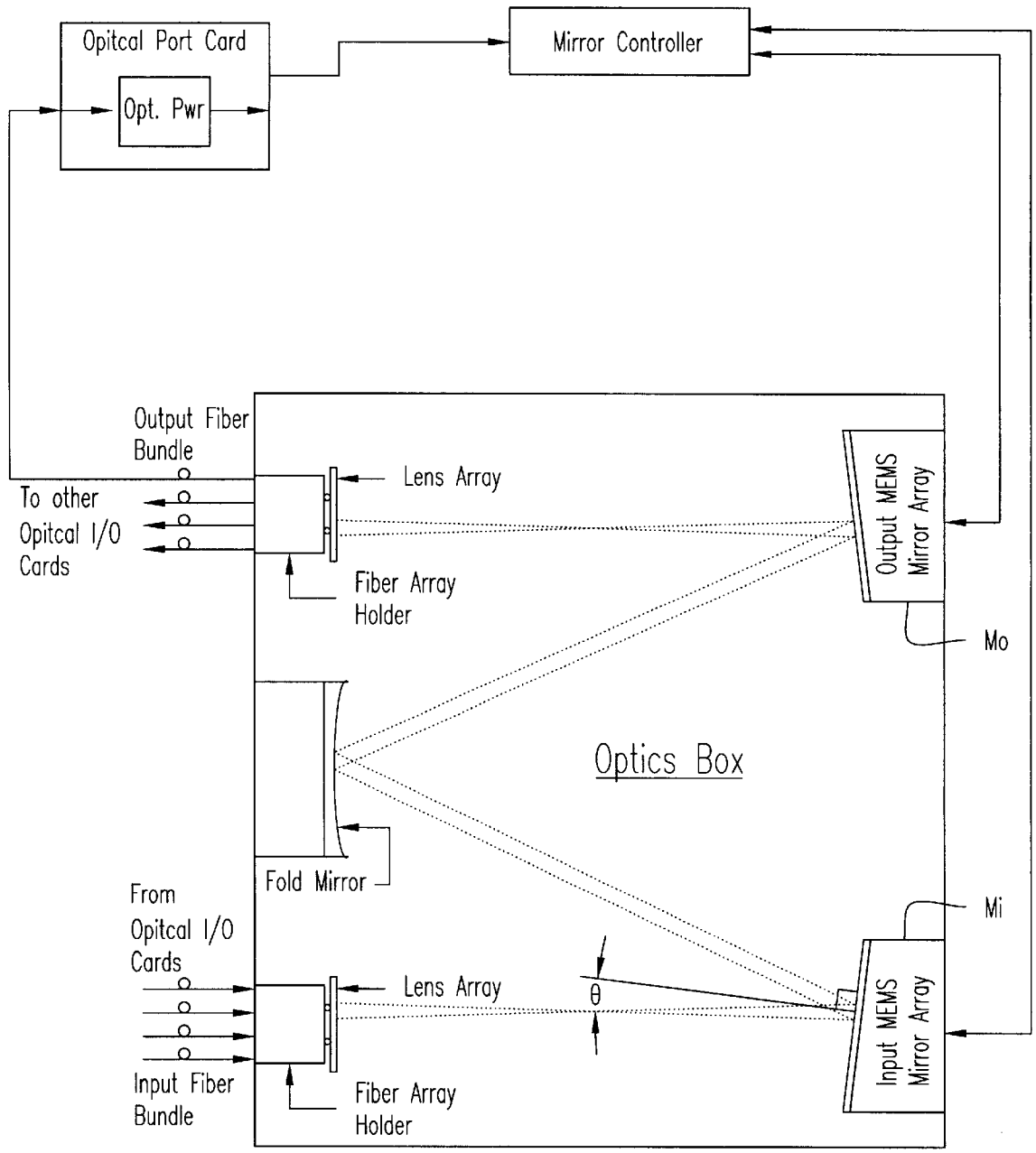

As before mentioned, it has been previously proposed to employ optical cross-connect switching configurations, as of the type shown in FIG. 1, using input and output MEMS mirror arrays $M_i$ and $M_o$ for respectively receiving light beams from an input fiber bundle from optical I/O cards and, via a central fold mirror, so-labelled, switching the same to an output fiber bundle as shown in the figure. The micromirrors of the MEMS arrays are shown controlled by a mirror controller, so labeled, which may contain digital or analog controllers and analog interfaces as described, for example, in the references [1]–[3] above. As earlier explained, however, the use of only port card optical power feedback provides a very slow loop with high requirements on the MEMS design, and does not provide directional information, necessitating extra time and computational power to adjust the mirror beam positions. Also as previously mentioned, prior use of only electrical feedback signals for DSP-controlled mirror positioned adjustment also has serious limitations in the lack of flexibility in the analog components implementing the controller, the lack of controller scalability since each mirror requires a dedicated controller, and the lack of DSP scalability because the DSP is tied to the controller all of the time.

In such and other prior art systems, moreover, switching connections have to await final micro-mirror adjustments and then the arrival of the actual or real or working data traffic before starting the switching connections.

Figure 2:
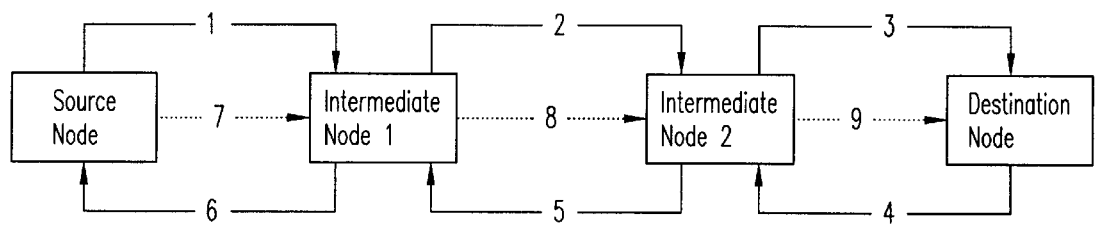

Through the use of the novel connection setup and provisioning signaling flow of FIG. 2, however, the present invention enables the material saving of overall switch connection setup time and additionally guarantees the integrity or success of the switch connection before the actual, real or working traffic data arrives.

In FIG. 2, for illustrative purposes, two intermediate nodes ("node 1" and "node 2") are schematically shown connected between the "source" and "destination" nodes of the optical switch, outlining how the optical switch setup of the present invention interacts with the high level protocol. Simply stated, through the use of test (laser) beams at the node ingress and of test detectors at the node egress, FIG. 3, as soon as an intermediate node knows its ingress and egress port numbers from the control plane, it will set up a connection using such test ports—not waiting until the real or working data traffic actually comes in to then start the connection setup by taking the advantage of MPλS (Mirror: Protocol Lambda Switching) signaling. In diagrammatic form, connections 1, 2 and 3 in FIG. 2 represents determining the ingress ports of the intermediate "node 1" and "node 2". Connections 4 and 5 schematically represent egress port determination of respective intermediate "node 2" and "node 1". PXC at each node will start to set up the MEMS micro-mirrors using the test ports, once both ingress and egress ports are known at this node, as will be more fully explained in connection with FIG. 3. Dotted connections 7, 8 and 9 schematically represent real or working data traffic starting to propagate from the source node to the destination node via the successive intermediate nodes. This technique of the invention, as previously stated, thus sets up connections using test ports (FIG. 3) once the intermediate node ingress and egress port numbers are known from the control plane, and without waiting until the real data traffic flows to start the connection setup.

Figure 3A:
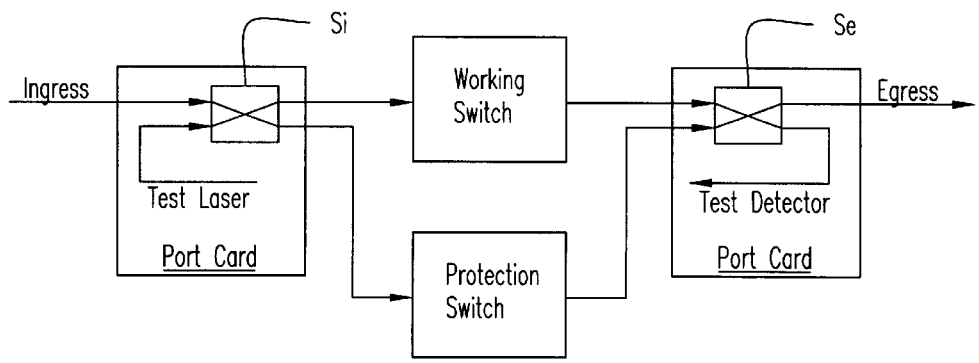
Figure 3B:
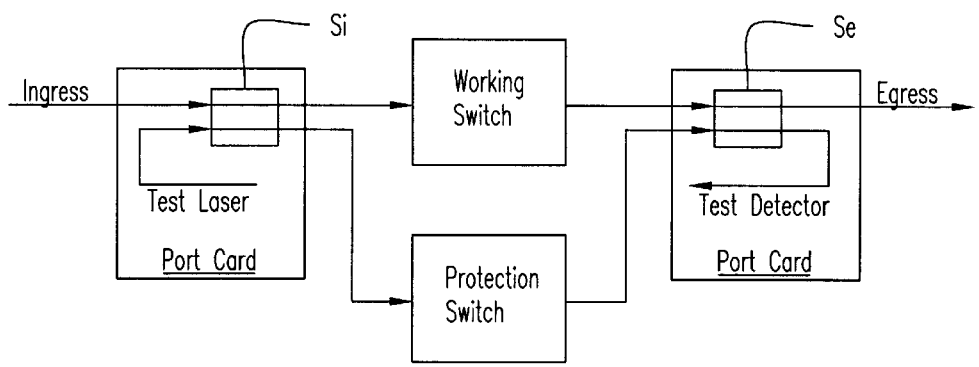

Considering, now, the details of this connection setup flow, as shown in FIGS. 3 (A) and (B), once a single node receives the information of ingress and egress ports, initially, and without the presence of any real or working optical data traffic signal (FIG. 3(A)), a 2×2 switch $S_i$ on the ingress port switches to a test "laser" on-board (so-labeled), and a corresponding 2×2 switch Se on the egress port switches to a test "detector" on-board. These 2×2 switches can also be shared as OSF "Protection" switches. Using the test laser and test detector the connection of the "Working Switch" for the actual data traffic can be set up and verified optically in advance of actual working data traffic since the test light and real working optical traffic signal pass through the same path inside this optical box. Even beam position optimization can be done using these test ports.

Once such connection is set up and verified, it will be reported to the upper level control plane. Then, the 2×2 switches are switched back to the normal position shown in FIG. 3(B), where the "Working Switch" is connected in the real data path at $S_i$ and $S_e$, while the test ports are connected to the "Protection Switch". While the "Working Switch" is passing the real traffic, the test ports are now used to set up an identical connection inside the Protection Switch using the same procedure. This further ensures the "Protection Switch" readiness at any given time. The equipment protection thus becomes an equivalent 1+1 protection, but without sacrificing optical power by requiring splitting of the traffic.

Figure 4:
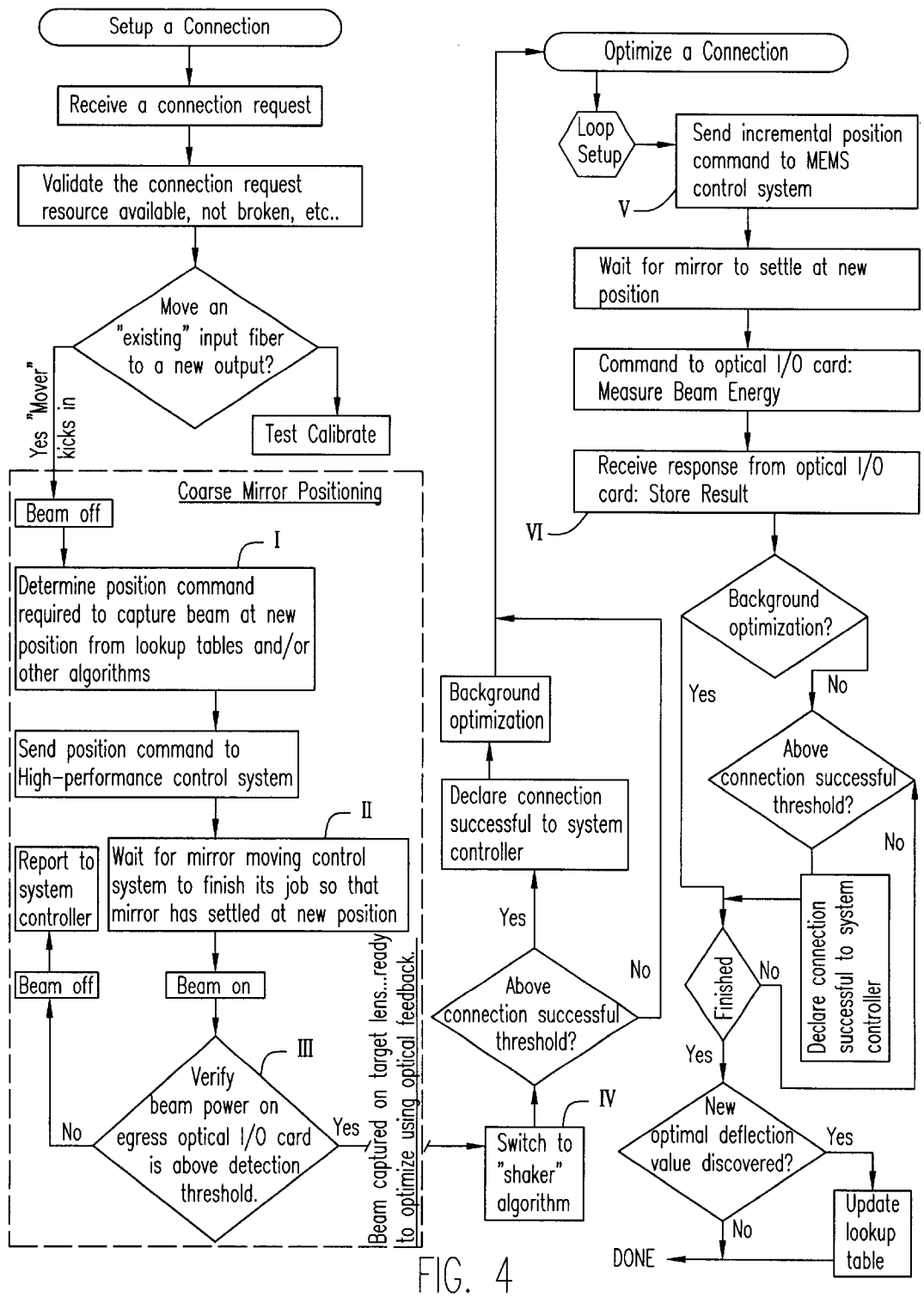

A more detailed explanation of such setup connections is provided by the flow chart of FIG. 4, tracing the software implementation of the same. As therein shown, the initial movement of a MEMS micro-mirror ("Mover") for switching an input fiber light beam to a new output fiber is controlled by the "coarse mirror positioning" sequence labeled at the left-hand column of the flow chart. Once the desired (coarse) mirror position command is determined at I, as from lookup tables or other algorithms, as is well-known, the mirror movement is effected to the new position at II. After verification of threshold signals at III, a "fine" mirror positioning is effected by switching to the before-mentioned and hereinafter more fully described "shaker" algorithm (IV), and optimizing the switch connection by incremental position commands to the MEMS control system (V) and optical power or energy feedback monitoring (VI), as more fully explained in the control loops shown in FIG. 5.

Figure 5:
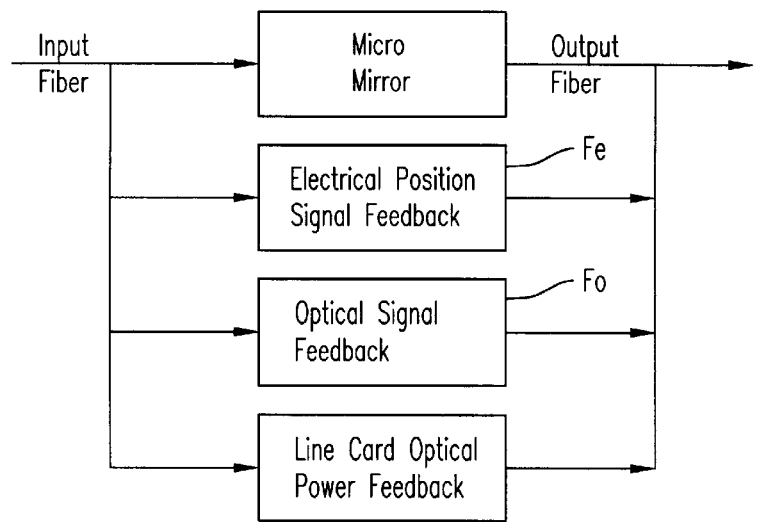

Each mirror in the optical switch is controlled by multiple control loops, with each loop accomplishing different goals. By combining the control loops, the requirements of speed and accuracy are met. The inner electrical position feedback loop $F_e$, FIG. 5, is to move the mirror to a designated position quickly in the before-described "coarse mirror positioning" of FIG. 4. This loop has a high bandwidth and can compensate for any high bandwidth disturbances after the connection is set up. The line card optical power feedback OF (the outer loop)—steps VI in FIG. 4—is a slow loop to detect if the light is always aligned precisely to the output fiber. Any small change will be detected and the mirror will be finely adjusted to compensate for it. This is a slow loop for such fine control only. Furthermore, this optical power feedback Fo, as previously stated, does not provide directional information; i.e. if the power reading decreases, the controller will not know which direction to move the beam to increase the power reading. Special algorithms may, accordingly, readily be used to converge this control loop more quickly.

To meet the control challenges outlined above, the beam moving and holding control systems are preferably partitioned to increase scalability. The "Mover" algorithm for coarsely moving the mirror to steer a beam from one fiber to a different output fiber is, however, relatively complex and difficult. As for the "Shaker" algorithm, the job of keeping the beam pointed at a particular output fiber is considerably simpler.

Figure 6:
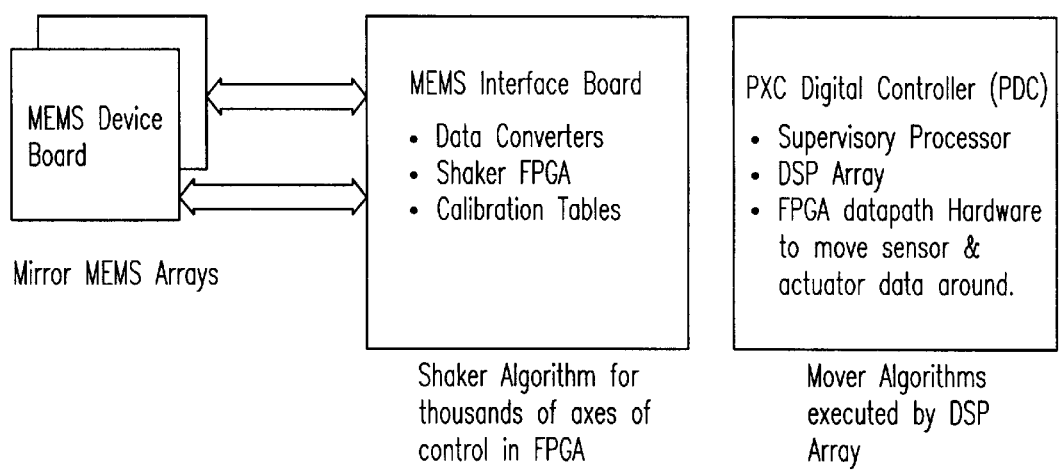
FIG. 6 illustrates the micro-mirror "shaker" and "mover" interface controls in the operational flow system of FIG. 4.
Figure 7:
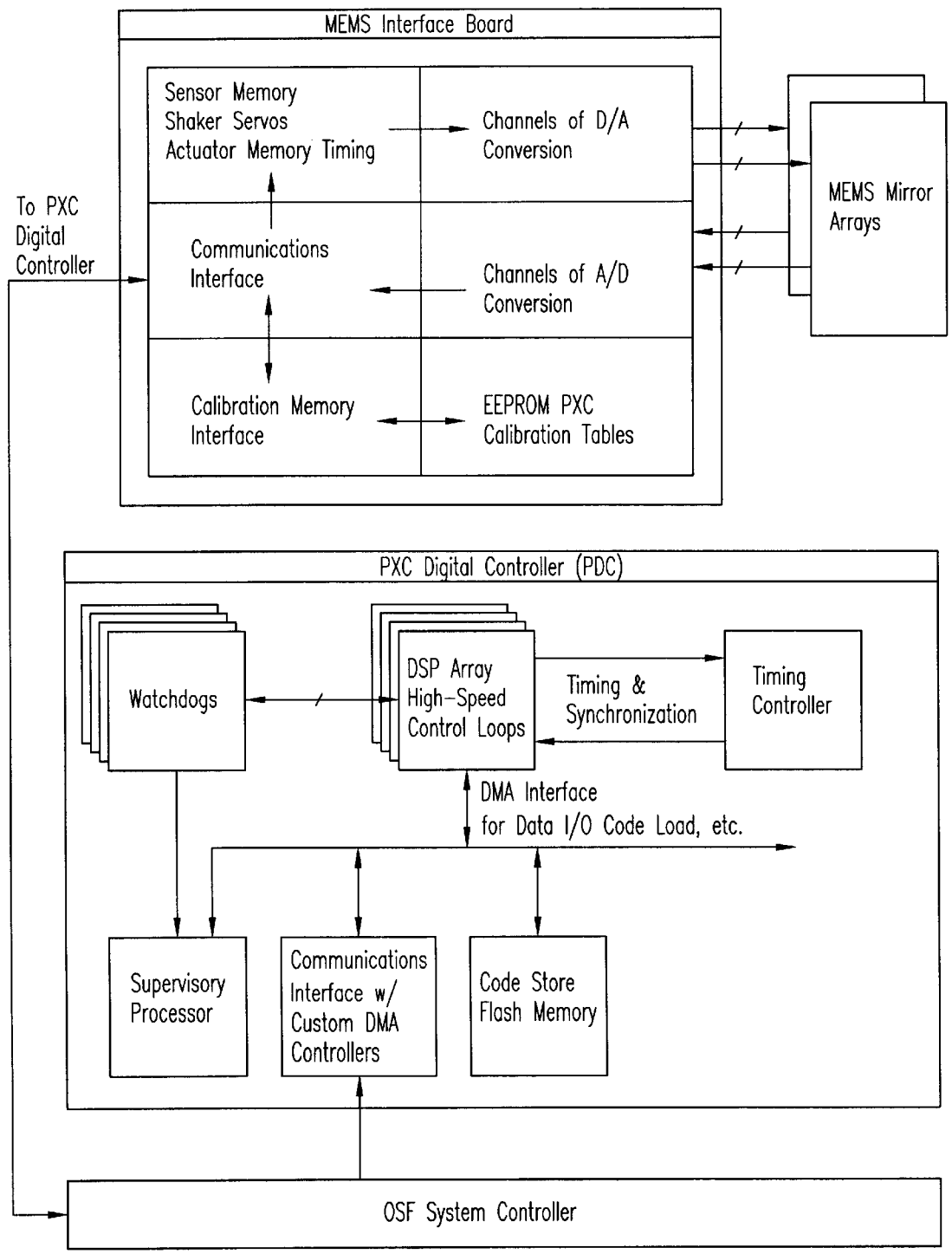
FIG. 7 is a block system diagram showing a preferred, though exemplary, hardware partitioning system and respective software components among the MEMS interface board, PXC Digital Controller (PDC) and the communication switch optical shelf controller.

FIG. 6, schematically showing the "Mover" and "Shaker" interface, and FIG. 7 illustrating the hardware partitioning, explain how this operation works. When the controller receives a command to set up the connections, the "Mover" algorithm running by the DSP will be activated to move the mirror from current position to designated position. Once this position is established and verified by the optical power feedback at III, FIG. 4 and at Fo, FIG. 5, the control will be transferred to the corresponding controller implemented by the "Shaker FPGA". Any small disturbance will be controlled by the "Shaker" algorithm. The MEMS interface board controls data acquisition of all mirror tilt angle sensor readings and also applies actuator commands per pod timing requirements. The "Shaker" algorithm is FPGA-implemented or by any other hardware oriented-implementation (FIG. 6) with sufficient memory and performance fully to control all servos when the switch configuration is static. The "Shaker" algorithm runs constantly in FPGA on all servos. The supervisory processor, however, will only enable the results of the "Shaker" algorithm to effect actuator commands as needed (i.e., if the servo is engaged and not under the control of the "Mover" algorithm). The MEMS analog interface board of FIG. 6, also sends all the mirror tilt angle sensor data to the PDC where some of the sensor data received is used by the "Mover" algorithms running on the DSPs. Some (usually most) sensor data will not be used, however, because there is no "Mover" algorithm active on that particular axis of control. Whichever "Mover" algorithms are executing, however, will generate the actuator commands. The PDC sends an array of such actuator commands. The actuator commands from the axis which are running the "Mover" algorithm will end up being used on the MEMS interface board. Finally, the supervisory processor on PDC allocates DSPs to execute the "Mover" algorithm on particular axis, and sets up pointers, tables, etc. to determine the flow of sensor and actuator data between and within the PDC and MEMS interface board, FIG. 7.

Further details of such "Shaker" FPGA algorithm flow are presented in FIGS. 8 (A)–(E).

FIG. 8(A) illustrates the collection of the A/D conversion results representing sensor data from the current time slot into the sensor memory. In FIG. 8(B), the sending of sensor data collected during the previous time slot to the PDC (FIGS. 6 and 7) is illustrated. The receipt of actuator commands for one time slot from the PDC and the storing of the same is shown in FIG. 8(C). This is the result of the "Mover" algorithm executed on the sensor data several time slots earlier. Only channels executing the "Mover" algorithm will have valid actuator commands to store.

In FIG. 8(D), the computing of the "Shaker" servo algorithm on the sensor data collected during the previous time slot is diagrammed. Actuator command memory only updates for channels not under control of PDC "Mover" algorithm, as before mentioned. Then, the actuator commands are sent for this time slot to the DACs in FIG. 8(E). These commands are the result of "Mover" or "Shaker" algorithms executed on sensor data collected several time slots earlier.

Finally, FIG. 9, as earlier stated, illustrates the "Shaker"/"Mover" data flow.

The sensor data is collected into sensor data memory and is the sensor data is sent to the "Mover" algorithm. As earlier mentioned, the "Shaker" algorithm runs on all sensor data (even disabled servos and servos under "Mover" control). If the position command to the "Shaker" algorithm is indicating a disabled servo or "Mover" control, this causes all history memories and also actuation memory to be zeroed when the "Shaker" algorithm executes. Thus, there is no need to specifically initialize state when it is desired to enable the "Shaker" algorithm. The "Mover" algorithm actuation data arriving are written into the actuation memory, FIG. 9, only if the value is not disabling (values other than disabling are the result of "Mover" computations). This data will arrive after the "Shaker" computation and will override the actuation data written by the "Shaker" computation.

An alternative digital control system (DCS) for the MEMS micro-mirror arrays is presented in FIG. 10, which shows a block diagram of a MEMS control board. The portion within the internal dotted lines is labeled "Digital Servo." This is an array of one or more DSPs executing controller algorithms (e.g. a PID controller) on a number of parallel channels (a "channel" in this discussion corresponds to a particular axis of a particular mirror). The control algorithm may be the same for all channels or may be customized on a per-channel basis as needed.

The basic operation is to sample a position sensor input for the channel, execute the control algorithm to generate an output based on that input and previous history, and apply the output to the channel. This basic operation is to be executed many times in parallel in many sets of inputs and outputs in a time slice fashion. The number of channels (twice the number of mirrors to be controlled), the required sample rate, and the amount of processing time needed by each iteration of the control algorithm determines the number of DSP processors required. The design allows for easily changing the number of DSPs being used.

A single A/D converter ("A/D" in FIG. 10) may be shared for all channels by providing and n:1 "Analog MUX" between the channel inputs and the A/D converter as shown to the right in FIG. 10. An alternate configuration could use multiple A/D converters. This might be desirable in some cases because it allows the use of slower A/D converters and of smaller analog MUXes.

The single D/A converter shared for all output channels provides a S/H (sample and hold) for each channel between the D/A converter and the driver for the channel. Since the S/Hs may be formed by a simple circuit such as an analog switch followed by a hold capacitor, they may have a droop rate which requires them to be refreshed periodically. The refresh rate requirement of the S/H circuits may be of higher frequency than the frequency at which each channel is visited by the control algorithm, and the design provides for this possibility.

In order to process the maximum number of channels per DSP, external circuitry is responsible for coordinating the selection of the input channel, the command to initiate the A/D conversion, and the placing of the conversion results into the appropriate memory location in a correct DSP. The DSPs are only responsible for running the controller algorithms and writing the output to the timing controller. The DSPs are designed to initiate the output to the timing controller so that the watchdogs can observe proper behavior. It should be noted that the DSPs also do not need to communicate directly with the outside world over the command/status interface. The "Auxiliary uP", FIG. 10, is responsible for this function. In this manner, the servo DSPs concentrate almost their entire processing power on the servo calculations.

Rather than having the DSPs directly writing to the D/A and selecting the S/Hs, moreover, a timing and refresh controller is inserted between the DSPs and the D/A (top of FIG. 10). The output commands from the DSPs are written into a memory in this block. The contents of the memory sequentially drives the D/A converter while the timing controller selects the appropriate S/H. This provides several advantages, notably that the memory is sequentially read out and the memory contents applied to the D/A and the appropriate S/H at a rate which does not have to depend on the frequency of the control loops being run by the DSPs. Thus, if the S/Hs need to be refreshed at a rate higher than the DSP processing rate, this is possible.

If a DSP fails and stops writing new control output values to the memory, furthermore, the last values written are maintained and applied to the S/Hs for the affected channels by the hardware refresh operation. This keeps the mirrors from losing their commands while the affected DSP is re-initialized.

Because the responsibilities of the DSPs have been stripped down to an absolute minimum, their operation is very predictable. They receive a periodic signal from the timing controller which causes them to run a fixed-length controller calculation. After the calculation, they output the result of the calculation by writing it to the timing controller. The watchdogs are thus able to watch that the calculated value emerges from the DSPs at exactly the expected time slot. If a problem is detected by the watchdogs, they inform the before-mentioned Auxiliary uP, which can then attempt to recover from the fault by re-starting the affected DSP. While this is happening, the mirror position is held by the timing controller hardware refresh feature.

The Auxiliary uP also offloads the DSPs from any responsibilities other than in servo calculations. This processor accepts commands and provides status to the outside world over the communications interface. To the extent that information from the outside world needs to be communicated to and from the DSPs, the uP transfers this information by way of DMA into the internal memories of the DSP. Information which may need to be transferred includes desired deflection angle for a particular channel (transferred to a DSP) and servo performance status and statistics (transferred from a DSP).

The "FLASH" memory of FIG. 10 holds executable code for both the Auxiliary uP and also for the DSPs. The Auxiliary uP is responsible for attempting to re-start a DSP in the that one of the watchdogs reports an error. The EEPROM Look-up tables are provided to hold calibration data. Examples of data held in such look-up tables may include the relationship between the D/A value and the drive voltage, the desired deflection values to achieve a particular system-level function, etc.

The details of the deflection memory implementation of the system are shown in FIG. 11, an explanation of the timing controller for the digital servo in the system of FIG. 10. In this configuration, the mirror analog interface receives digital commands from a Deflection Memory where the location of the data is controlled by the Scan Logic. The DSP only updates the data at proper locations of the Deflection Memory but not interrupting the scanning and mirror forcing from the Deflection Memory to the analog interface and to the mirror.

This accomplishes both primer position forcing and maintaining (refreshing) functions by simple and homogeneous hardware.

Advantages of this alternate DCS approach reside in the fact that the DSP devices perform only servo calculations and are relieved of almost all tasks not associated with actual calculations. Means is provided for detecting and recovering from a DSP fault, and the refreshing of control signals to the mirrors is independent of DSP operation.

In accordance with the present invention, accordingly, a digital controller system is provided for the MEMS micromirrors based on a combination of two control loops an electrical sensing loop (using capacitive, coarse control), and an optical power feedback loop (fine control). A separate control is provided for moving a mirror to a designated position from the control for holding and maintaining the mirror at its precise position. This increases the scalability of the control hardware and software. After connections are set up successfully, moreover, beam position optimization is continually performed in the background without interruption of the connection. This optimization is done by small incremental adjustments of the mirror positions while monitoring optical power fluctuation. This optimization is crucial to guarantee that the next mirror moving will be captured by another fiber; i.e. the calibration table is always optimized. The invention, moreover, uses test ports to set up paths even before the real data traffic answers, in order to reduce path set up time and guarantee the connectivity. This is also used regularly to exercise the mirrors which are not used by the current connections to compensate for any shift.

Further modifications will also occur to those skilled in this art and such are considered to fall within the scope and spirit of the invention as defined in the appended claims.

What is claimed is:

1. In an optical path switching system wherein light beam data traffic is to be switched by MEMS orientable mirrors between a source node and a destination node through intermediate nodes having ingress and egress ports that are to be connected to set up the desired optical path connection between a source and destination nodes and under the control of a protocol control plane, a method of reducing the overall switch connection setup time while guaranteeing the integrity of the connection before the actual propagating of the data traffic from the source, that comprises, transmitting a test light beam from the ingress port of each intermediate node to a test detector at its egress port upon the identifying from the control plane of the ingress and egress port numbers of the node, thereby to set up and verify the integrity of an optical path connection therebetween, thereupon terminating the test light beam transmission; and then awaiting the subsequent propagation of the data traffic from the source along the setup connected optical path to the selected destination node, wherein the optical path includes a working switch interposed between each intermediate node ingress and egress port through which the data traffic from the data source is propagated, and the test light beam is transmitted through the working switch during the test verifying said integrity of the optical path connection; and wherein an external protection switch is provided to which the test light beam is switched following said verifying of the optical path connection through the working switch.

2. The method of claim 1 wherein the optical path includes a working switch interposed between each intermediate node ingress and egress port through which the data traffic from the data source is propagated, and the test light beam is transmitted through the working switch during the test verifying said integrity of the optical path connection.

3. The method of claim 1 wherein the test light beam is transmitted through the protection switch to the test detector during the passing of data traffic through the working switch.

4. The method of claim 1 wherein the mirrors are oriented by an electrical position—sensing feedback loop controlling a coarse positioning of the mirrors for directing the optical path switching, and also by an optical beam path power-sensing feedback loop for fine adjustment in the mirror position.

5. The method of claim 4 wherein the controlling of the moving of the mirror to a designated position is separately and independently effected from the controlling of the holding and maintaining of the mirror at a desired precise position.

6. The method of claim 4 wherein the fine adjustment is effected by optimizing small incremental adjustments of the mirror position in response to the monitoring optical power fluctuations along the optical path set by the mirrors.

7. In an optical path switching system and architecture wherein light beam data traffic is to be switched by MEMS orientable mirrors between a source node and a destination node through intermediate nodes having ingress and egress ports that are to be connected to set up the desired optical path connection between source and destination nodes and under the control of a protocol control plane, apparatus for reducing the overall switch connection setup time while guaranteeing the integrity of the connection before the actual propagating of the data traffic from the source, having, in combination, a test light source provided at the ingress port of each intermediate node and a test light detector provided at its egress port; means operable upon the identifying from the control plane of the ingress and egress port numbers of the intermediate node for activating the test light source to transmit the test light beam to the detector and to set up and verify the integrity of an optical path connection between the ingress and egress ports; means for thereupon terminating the test light beam transmission and means for enabling the subsequent propagation of working data traffic from the source along the connected optical path to the selected destination node, wherein the optical path includes a working switch interposed between each intermediate node ingress and egress port through which the data traffic from the data source is propagated, with the test light beam being transmitted through the working switch during the test verifying said integrity of the optical path connection and wherein an external protection switch is provided to which the test light beam is switched following said verifying of the optical path connection through the working switch.

8. The system of claim 7 wherein the optical path includes a working switch interposed between each intermediate node ingress and egress port traffic from propagated, with the test light through the test verifying said integrity of the optical path connection.

9. The apparatus of claim 7 wherein the test light beam is transmitted through the protection switch to the test detector during the passing of data traffic through the working switch.

10. The apparatus of claim 7 wherein the mirrors are oriented by an electrical position—sensing feedback loop controlling a coarse positioning of the mirrors directing the optical path switching, and also by an optical beam path power-sensing feedback loop for fine adjustment in the mirror position.

11. The apparatus of claim 10 wherein means is provided for controlling the moving of the mirror to a designated position separately and independently from means for the controlling the holding and maintaining of the mirror at a desired precise position.

12. The apparatus of claim 10 wherein means is provided for effecting the fine adjustment by optimizing small incremental adjustments of the mirror position in response to the monitoring optical power fluctuations along the optical path set by the mirrors.

* * * * *